Patented Dec. 7, 1943

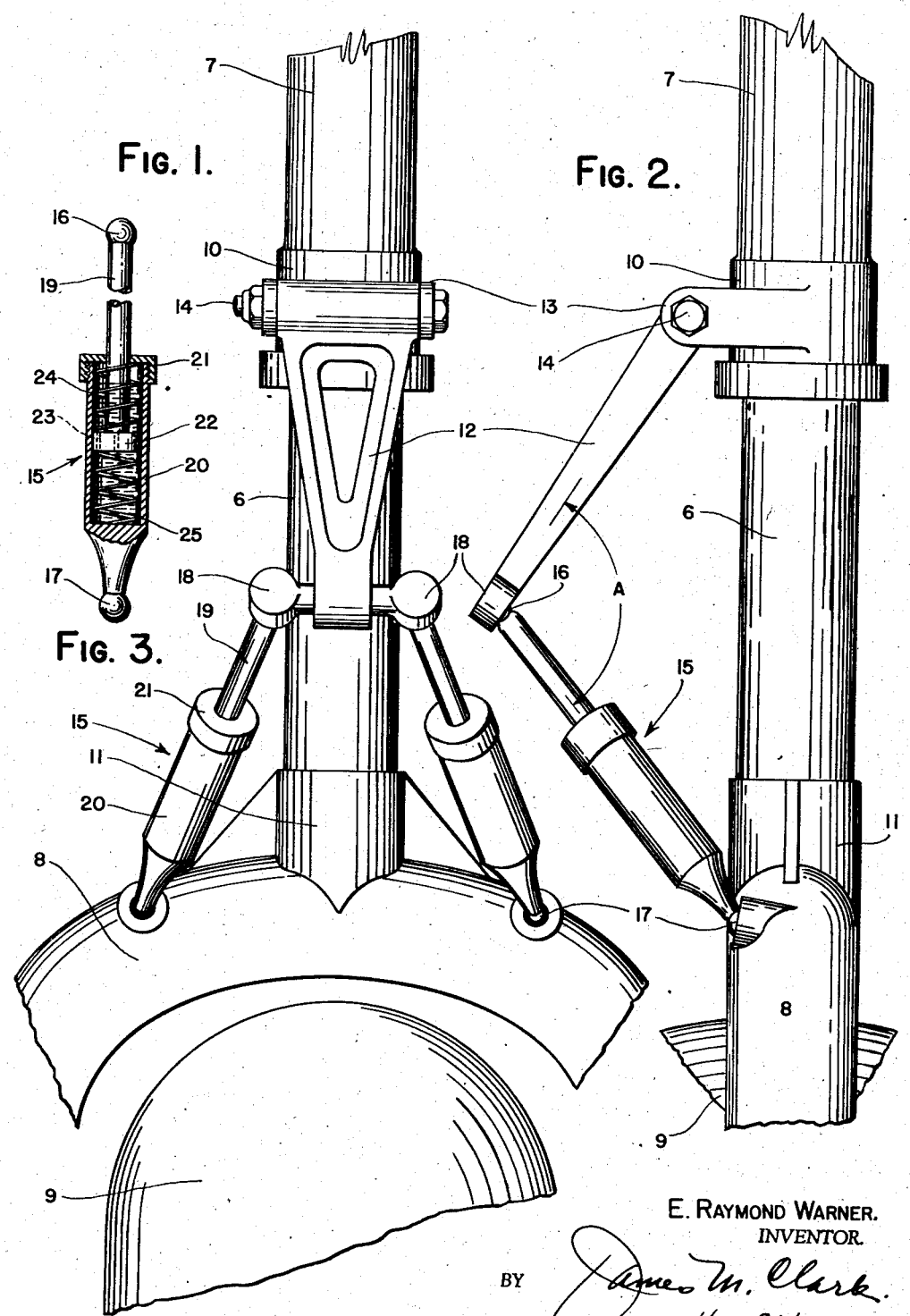

2,336,203

UNITED STATES PATENT OFFICE 2,336,203

AIRCRAFT LANDING GEAR

Edward Raymond Warner, Glendale, Calif., assignor to Lockheed Aircraft Corporation, a corporation of California Application October 24, 1940, Serial No. 362,541

16 Claims. (Cl. 244—104)

This invention relates to improvements in shock absorbers for aircraft landing gears and more particularly to devices for arresting and dampening torsional shimmying tendencies in swivelling landing wheels.

The design of modern aircraft frequently re-requires the provision of swivelling landing wheels particularly in the nose wheels of tricycle type landing gears and in the tail wheels of other landing gear arrangements. While it has been found very advantageous in the landing, take-off and taxiing of aircraft equipped with swivelling nose wheels, due to the inherent directional stability of the resulting tricycle gears, their use has been restricted to a considerable extent as the result of the inherent tendency of the swivelling wheel to build up torsional oscillations more commonly known as "shimmy." This problem has also presented itself in connection with swivelling aircraft tail wheels and while a number of expedients have been suggested or used for the elimination of such shimmying tendencies about the axis of the wheel strut, very few have been successful to any degree.

The present invention presents a simple solution to this problem by providing an articulated torque link containing dampening elements which serve to effectively reduce the magnitude of the torsional oscillations, while permitting the normal swivelling action of the wheel. The present device in combining the torque scissors and shimmy dampener also is arranged to provide a damping effect which will vary in response to a change in the load on the landing wheel whereby it is considerably more effective.

It is accordingly a major object of the present invention to provide simple and effective means for damping out or resisting the shimmy of a swivelling aircraft landing gear wheel. It is a further object of the invention to provide such a device for stabilizing the landing gear against shimmy whereby the damping effect will vary in response to changes in load upon the landing wheel. It is also an object to provide a combination torque scissors and shimmy dampener for use on an aircraft landing gear having a swivelling wheel, which has the additional function of restoring the wheel to its normal or central position after displacement forces have been removed.

Other objects and advantages of the present invention will become apparent to one versed in the art after a reading of the following specification and the attached drawing forming a part thereof.

In the drawing:

Fig. 1 shows a front view of a portion of a cantilever landing gear strut and wheel provided with the combined torque arm and shimmy dampener of the present invention;

Fig. 2 is a side view of the mechanism shown in Fig. 1; and

Fig. 3 is a cross sectional view of one of the dampening elements utilized in the lower link portion of the combined torque arm and shimmy dampener.

In Fig. 1 the numeral 6 discloses the lower or wheel-carrying piston element of the landing gear strut which is adapted to telescope within the upper or cylinder portion 7. The upper portion is preferably steerably associated with the structure of the aircraft and when desirable suitable mechanism of a type well known in the art may be provided for its retraction either wholly or partly within the body or wings of the aircraft. This invention accordingly is applicable to either fixed or retractable landing gear arrangements and may be applied to struts which are supported from either the nose or tail portions of the fuselage, or from the wings. It is also applicable to swivelling wheels over which the pilot may superimpose steering movements by suitable mechanism at will.

The piston element 6 in collapsing within the cylinder portion 7 is opposed by a suitable oleo shock absorber or other suitable type, preferably of a construction in which both a spring and a hydraulic fluid opposes the collapse of the two elements for the cushioning and absorbing of axial shocks. The piston element 6 is provided at its lower terminal with a wheel yoke, or fork, 8 upon which the landing wheel 9 is rotatably mounted. The fork 8 is provided at its upper central portion by a suitable fitting 11 into which the piston element 6 is rigidly fixed. At the lower terminal of the upper or cylindrical element 7 there is provided an enlarged portion 10 provided with bifurcated lugs 13. These lugs are laterally spaced to embrace the upper sleeve portion of the triangular link 12, the lugs being apertured to provide for the hinge bolt 14 such that the link 12 is pivoted upon this bolt and is free to swing only in a substantially vertical plane. The lower or outer terminal of the link 12 is also provided with a transverse aperture within which the socket fitting 18 is retained. The fitting 18 is preferably free to rotate within the link 12 and has the axis of its shank portion extending laterally in a direction parallel to the axis of the bolt 14, but is suitably restricted from movement in this axial direction. The outer extremities of the fitting 18 are provided with enlarged disc portions, each having a spherical socket formed within its lower surface.

The lower half of the combined torque arm and shimmy dampener is composed of two hydraulic damping elements 15 having ball portions 16 which universally engage the sockets of the fitting 18 at their upper terminals, and are provided with ball elements 17 at their lower terminals which are universally mounted within similar socket elements within suitable boss portions of the wheel fork 8. The two hydraulic elements 15 are relatively greatly spaced at their lower universal mountings at the wheel fork such that they converge as they extend upwardly and outwardly to their mountings in the fittings 18.

As indicated more clearly in Fig. 3, the hydraulic units comprise a piston rod 19 and piston 22 which telescopes within the cylinder element 20 which in turn is provided with a cap 21 apertured for the rod 19 and provided with suitable means to make an oil tight joint between the cap 21 and the open end of the cylinder 20, and between the sliding piston rod 19 and the opening in 21. The piston rod 19 carries the ball 16 for the universal mounting at its upper terminal and a similar ball element 17 is provided at the lower terminal of the cylinder element 20. A piston 22 is fixed to the lower terminal of the piston rod 19 and is provided with openings 23 extending in an axial direction and providing limited passages between the chambers formed within the cylinder on each side of the piston. Compression springs 24 and 25 are fitted within the cylinder 20 and interposed between its lower end and the piston 22 and between the upper face of the piston and the cap member 21. The cylinder 20 contains a predetermined quantity of shock absorber oil, or other non-compressible fluid, such that in the completely collapsed relationship of the two movable elements there is relatively little air remaining compressed between the upper surface of the fluid and the cap 21. In the centered position of the piston as shown in Fig. 3 an air space is provided above the oil level to provide for the additional displacement of the rod 19 which is preferably made with a hollow lower portion.

The figures show the static position of the landing wheel with respect to the relatively fixed strut element 7, in which the torque link arrangement forms at its apex the angle which is designated in Fig. 2 as angle A. Obviously, as the wheel would be suspended in flight the angle A would increase, and under impacts or landing shocks the angle would be reduced. In the operation of the present device as the aircraft taxies along the ground the wheel may be subjected to both vertical and lateral forces which tend to collapse the strut 6—7, and to cause relative rotation between the two elements, respectively. As the wheel is subjected to vertical impacts the upper link 12 and the damping units 15, forming the lower link, rotate about the pin 14 and the universal fittings 17, respectively, flattening out to an extent determined by the resistance of the shock absorber within the main strut 7, thus reducing the angle A. Should the wheel 9 be subjected to forces which tend to set up torsional oscillations or shimmy, such forces will necessarily be transmitted by partial rotation of the wheel fork 8 and corresponding collapse of the adjacent hydraulic unit 15 and like extension of the opposing element 15. The collapse and extension of the elements 15 are opposed within their cylinders 20 due to the damping effect of the metering orifices 23 within the piston 22 opposing the rapid movement of the latter within the cylinder. The metering orifices 23 are designed such that they provide relatively low resistance to piston movement at slow speeds of rotation of the wheel about the shock strut axis as normally attends swivelling action, and to give considerable resistance at higher speeds of rotation, and correspondingly rapid piston movement at those speeds tending to produce shimmy. Such higher speeds of rotation and piston movement as are induced by wheel shimmy are thus damped out before tendency toward increased or continued shimmying action can begin.

In addition to the function of the hydraulic units in providing low resistance to their collapse at the slow rotational movement of the wheel in swivelling, an additional feature of major importance is provided by the disposition of the dampening units 15 such that their resistance to shimmy also increases substantially proportionately to the load on the landing wheel. It will be noted that the lower universal mountings 17 of the units 15 are relatively more widely spaced than the upper mountings 16 within the fitting 18 at the given angle A for the normal static relationship of the wheel struts. However, as the landing impacts, or other loads, exerted upon the wheel 9 cause telescopic collapse of the strut 6—7 and corresponding reduction of the angle A the units 15 assume a more nearly horizontal attitude in which they exert greater resistance to relative torsional movement between the struts 6 and 7. This is due to the higher speed of collapse of the units 15 for a given relative rotational speed between the elements 6—7 when the units 15 are nearly horizontal than when they are more vertically disposed. In order that the damping forces in the hydraulic mechanism 15 may be maintained as low as possible, it is desirable to have the joints 17 disposed at a maximum lateral distance from the shock strut axis.

As soon as the lateral forces tending to produce shimmy of the wheel 9 are dissipated by the damping mechanism 15 the wheel is restored to its normal central position by means of the compression springs 24 and 25 which serve to return the pistons 22 to their central positions within each unit 15. When the pistons are again centered within each cylinder the over-all length of each unit 15 again returns to its normal length, in which both units are equal, and the wheel is then in its normal central position. This equalizing action also serves to maintain the wheel in neutral position for retraction of the gear. Steering forces are applied to the strut 7 and are resiliently transmitted to the wheel strut without inducing shimmy and all other lateral displacing forces are similarly damped out and the wheel automatically returned to its normal position upon dissipation of the disturbing force. While the present embodiment shows a fork for supporting the wheel at both ends of the wheel axle, it is obvious that the invention is not limited to such design but may be readily adapted to a wheel fork provided with a single tine, or a number of other arrangements might be utilized, it being only necessary that the joints 17 have a fixed relation with respect to the landing gear wheel; or that the combined torque and shimmy arrestor assembly might be disposed on the trailing side of the landing gear strut instead of on the forward side as shown in the drawing. It is to be noted that this invention also provides for a lighter design in that the lower torque arm serves the double purpose of limiting torsional movements between the telescoping strut members while at the same time replacing cumbersome shimmy arrestors which have heretofore been provided only with difficulty due to the relative axial displacement between the strut members and the necessity of providing additional brackets which have added considerably to the weight of the landing gear.

Other advantages and results of the present invention which may become obvious to those skilled in the art, resulting in modifications both in arrangement and detail design, are each intended to come within the scope and spirit of the present invention as more clearly defined in the appended claims.

I claim:

1. Aircraft landing gear construction including a shock absorber comprising telescopic members for cushioning axial forces, one of said members adapted to rotatively swivel with respect to the other, a link pivotally connected to one of said members, dual elements universally connected to the other of said members and to said link, and means carried by said elements adapted to damp out torsional oscillations induced by excessive rotative movements of said members and to permit of less rapid movements incident to said swivelling action.

2. In a shock absorber having relatively rotatable telescopic members adapted for cushioning axial forces, a rotational dampening device comprising a link pivotally connected to one of said members, dual elements universally connected to the other of said members and to said link, hydraulic damping means operatively associated with said elements, said elements being disposed such that their connections to said link are more closely spaced that the points of their connections to said shock absorber member whereby rapid rotative movement of the said member to which said elements are connected causes said means to increasingly damp out torsional oscillations induced by said movements as said members are further telescoped by increased axial forces.

3. In a shock absorber having relatively rotatable telescopic members adapted for cushioning axial forces, a rotational dampening device comprising a link pivotally connected to one of said members, dual telescopic elements each universally connected to the other of said members and to said link, said elements convergingly disposed with respect to each other such that their points of attachment to said link are more closely spaced than their points of attachment to said member, said telescopic elements having damping devices effective upon telescopic elongation or contraction of said elements, whereby relative rotative movement between said telescopic members causes telescopic movements of each of said elements and corresponding damping of said rotative movements.

4. In a shock absorber having relatively rotatable telescopic members adapted for cushioning axial forces and a wheel rotatably carried by the lower of said members adapted for swivelling movement therewith with respect to the upper said member, a dampening device comprising a link pivotally connected to the upper of said members, dual hydraulic units universally connected to said wheel-carrying member at remotely spaced points and to the said link at more closely spaced points, the said hydraulic units containing damping means effective upon telescopic contraction or extension of the unit, the said link and hydraulic units being angularly disposed with respect to the axis of the telescopic shock absorber members such that swivelling of the wheel-carrying member in the partially contracted state of the shock absorber causes correspondingly increased telescopic action of said hydraulic units and increased damping effect.

5. In a shock absorber having telescopic members adapted for cushioning axial forces in which one of said members is adapted to partially swivel with respect to the other, a shimmy dampening device comprising a link pivotally connected to one of said members, and dual elements universally connected to the other of said members and to said link, said elements each comprising a fluid-containing cylinder and a piston provided with fluid metering passages adapted to damp out torsional oscillations induced by rotative movements in excess of said predetermined swivelling movements.

6. In a landing gear having a shock absorbing strut comprising members capable of cushioned telescopic movement and partial swivelling movement, a shimmy dampening device including a linkage assembly comprising a link of fixed length pivotally connected to one of said members and two variable length units universally connected to said fixed link and to the other of said members, fluid means associated with said units adapted to damp out movements exceeding in rate those accompanying predetermined swivelling rates, the said variable units being disposed such that their damping effect is increased as said members are more closely telescoped, and spring means associated with said variable links adapted to restore said members to their central position upon the dissipation of forces causing swivelling displacements.

7. In a shock absorber comprising telescopic members adapted for cushioning axial forces in which one of said members is adapted to swivel partially with respect to the other a shimmy dampening device comprising, a link pivotally connected to one of said members, and dual elements universally connected to the other of said members and to said link, said elements each comprising telescopic piston and cylinder portions, each piston being provided with fluid passages interconnecting both ends of the cylinder, each end of the cylinders also containing a spring, fluid means contained within said cylinder portions, the said dual elements being convergingly disposed whereby they freely permit telescoping of said shock absorber members, resiliently oppose said swivelling movements of said members, and damp out torsional oscillations in excess of rotational rates accompanying said swivelling movements, the said spring acting upon the pistons serving to rotatively restore said members to their central positions.

8. An oscillation damping device for interconnecting two relatively rotatable telescopic members, including a fixed length element having a terminal attached to the first of said members, at least one variable length element having a terminal attached to the second said member, said elements having their remaining terminals attached to each other, said elements being angularly disposed with respect to the axis of said members such that they freely permit axial telescoping of said members, and means actuated by the variation in length of said second element adapted to damp out torsional oscillations accompanying relative rotation between said members.

9. In a swivable wheel suspension including a relatively fixed member and a wheel-carrying member co-axially telescopic and rotatable with respect thereto, and shock absorbing means for resiliently opposing telescopic movement of said members, a combined torque scissors and shimmy damping device comprising a fixed length element articulated to one of said members, two telescoping elements spatially articulated to the other said member, resilient and hydraulic means oposing the telescopic of said elements, said elements being convergingly disposed and articulated to each other in the region of a common apex outwardly spaced from the axis of said members, such that co-axial shock absorbing movements of said members are freely permitted by said articulated elements, normal swivelling movements resiliently opposed and returned to neutral position by the resilient means of said telescoping elements, and more rapid torsional oscillations damped out by the hydraulic means of said telescoping elements.

10. In an aircraft landing gear, the combination with a shock absorbing strut comprising relatively telescoping and swivelling strut members, of coupling a device in the form of a tripod linkage flexibly interconnected at its apex and connected at its divergent portions to said strut members, said linkage including means adapted to resiliently oppose normal swivelling and to damp out shimmying oscillations, while permitting said telescopic movements.

11. The combination with a shock absorber including relatively rotational and telescopic members adapted for cushioning axial forces, of a torque arm damper comprising a link pivotally connected to one of said telescopic members, dual telescopic elements universally connected to the other of said telescopic members and to said link, and hydraulic means opposing telescopic movement of said elements adapted to damp out torsional oscillations induced by rapid relative rotative movements of said strut members.

12. In a shock absorbing strut for a landing gear having members capable of cushioned telescopic and partial swiveling movements about said strut axis, a shimmy damping device comprising upper and lower torque links flexibly connected to each said member and to each other, and means associated with at least one of said links for increasingly damping said rotational movements as said strut members are telescopically compacted.

13. In an aircraft landing gear including a shock absorbing strut comprising a member supported by the aircraft and a wheel-carrying member adapted for telescopic axial and swiveling movement within said first member, a shimmy dampening device comprising torque linkage means flexibly interconnecting said telescoping strut members, and hydraulic means self-contained within said linkage means adapted for the dampening of swiveling oscillations while permitting axial telescoping of said strut members.

14. A shimmy dampening device for the interconnection of the relatively rotatable and telescopic members of a shock absorber strut, said device comprising a link element pivotally mounted upon the upper of said strut members, dual telescopic elements universally mounted upon the lower said strut members at their lower divergent terminals and universally connected to the outer terminal of said link element at their upper converging terminals, resilient and hydraulic means carried by said link elements whereby normal rotative movements of said strut members are resiliently opposed and torsional oscillations between these members are damped out.

15. In a landing device for aircraft, a shock absorbing strut including upper and lower telescoping members adapted for relative rotation, the upper said member supported upon the aircraft, the lower said member including a ground-engaging element, a torque link pivotally connected at an inner portion to one of said strut members, and a flexible torque element universally connected to an outer portion of said torque link and to the other said strut member whereby relative rotation of said strut members is retarded.

16. In a landing device for aircraft, a shock absorbing strut including upper and lower telescoping members adapted for relative rotation, the upper said member supported upon the aircraft, the lower said member including a ground-engaging element, a torque link connected at an inner portion to one of said strut members, and a compressible hydraulic strut interconnected between an outer portion of said torque link and the other said strut member whereby relative rotation between said strut members is progressively retarded as said members are telescopically compressed.

EDWARD RAYMOND WARNER.

CERTIFICATE OF CORRECTION.

Patent No. 2,336,203. December 7, 1943.

EDWARD RAYMOND WARNER.

It is hereby certified that error appears in the printed specification of the above numbered patent requiring correction as follows: Page 4, first column, line 28, claim 10, for "of coupling a device" read --of a coupling device--; and that the said Letters Patent should be read with this correction therein that the same may conform to the record of the case in the Patent Office.

Signed and sealed this 7th day of August, A. D. 1945.

(Seal)

Leslie Frazer
Acting Commissioner of Patents.